D. W. WEAVER.
Circular-Saw.

No. 220,008. Patented Sept. 23, 1879.

WITNESSES:
Chas. Nida
C. Sedgwick

INVENTOR:
D. W. Weaver
BY Munn & Co
ATTORNEYS.

UNITED STATES PATENT OFFICE.

DANIEL W. WEAVER, OF BLACKSHEAR, GEORGIA.

IMPROVEMENT IN CIRCULAR SAWS.

Specification forming part of Letters Patent No. 220,008, dated September 23, 1879; application filed July 18, 1879.

*To all whom it may concern:*

Be it known that I, DANIEL W. WEAVER, of Blackshear, in the county of Pierce and State of Georgia, have invented a new and Improved Circular Saw, of which the following is a specification.

The object of my invention is to prevent dishing or buckling of circular saws by unequal expansion when heated; and the invention consists in a saw made in two portions, the central portion being separate, and attached in a manner that permits radial expansion and contraction without effect on the outer portion or rim.

Figure 1:
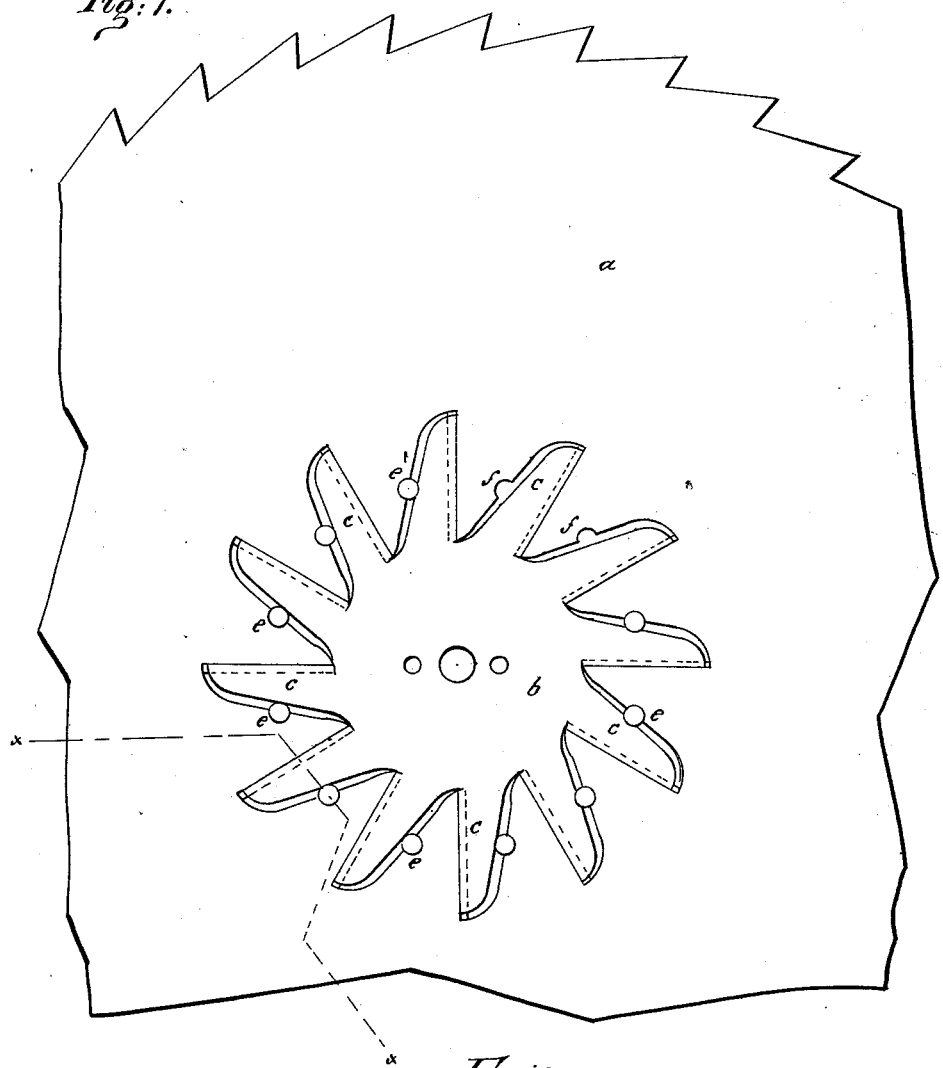
Figure 2:
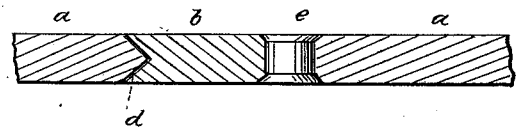

The invention is shown by the accompanying drawings, wherein Figure 1 is a side view of a portion of a circular saw constructed in accordance with my invention. Fig. 2 is a sectional view on line $x\ x$, Fig. 1.

Similar letters of reference indicate corresponding parts.

The saw is formed of an outer or rim portion, $a$, apertured at the center to receive the central portion, $b$. The center $b$ is formed with radiating tongues or points $c$, each of which is formed with the forward edge straight and on a radial line, and the back edge inclined. The forward edge of each tongue is formed also with a V-shaped groove, as shown in Fig. 2. The aperture in the portion $a$ is of a shape to receive the center $b$, with the slots for the tongues $c$ somewhat wider and longer than the tongues, and the straight sides of these slots are beveled or formed with a tenon, $d$, for entering the groove in the tongues.

The center is retained in place by rivets $e$, inserted behind the back edge of each tongue $c$, between that and the adjoining edge of the portion $a$. By these rivets the tongues $c$ are forced tightly upon the tenons $d$; and to prevent any movement of the rivet, semicircular notches $f$ are formed in the edges of the slots in $a$, which notches hold the rivet.

In operation, as the central portion of the saw becomes heated it expands within the aperture in which it is held, without effect upon the other part of the saw, and the saw will not be buckled or dished by such expansion. The tongues $c$ slide readily upon the rivets in the movement caused by expansion and contraction, and the centrifugal action tending to misplace the rim upon the center is overcome, as the rivets hold the parts securely in every direction.

By forming the central portion with the tongues or points I am enabled to place the rivets at points where they do not prevent radial expansion.

Having thus fully described my invention, I claim as new and desire to secure by Letters Patent—

A circular saw having rim $a$ and center piece, $b$, secured together by rivets $e$, the piece $b$ having points $c$, whose forward edge is straight, and back inclined, while the piece $a$ has slots extending from central aperture made wider and longer than said points and corresponding thereto, as shown and described.

DANIEL W. WEAVER.

Witnesses:
E. J. DENTON,
J. W. STRICKLAND.